United States Patent
Yu et al.

(10) Patent No.: US 9,137,290 B2
(45) Date of Patent: Sep. 15, 2015

(54) IMAGE FORMING APPARATUS TO DETERMINE PRE-STORAGE OF A MAC (MEDIA ACCESS CONTROL) ADDRESS, MANAGEMENT METHOD THEREOF, AND COMPUTER READABLE RECORDING MEDIUM

(71) Applicant: SAMSUNG Electronics Co., Ltd., Suwon-si, Gyeonggi-do (KR)

(72) Inventors: Hyeong-bae Yu, Suwon-si (KR); Chang-gun Ko, Suwon-si (KR); Sung-hoon Bae, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 280 days.

(21) Appl. No.: 13/667,125

(22) Filed: Nov. 2, 2012

(65) Prior Publication Data

US 2013/0159541 A1    Jun. 20, 2013

(30) Foreign Application Priority Data

Dec. 16, 2011 (KR) .......................... 10-2011-0136713

(51) Int. Cl.
*G06F 15/173* (2006.01)
*H04L 29/08* (2006.01)
*H04L 12/24* (2006.01)
(Continued)

(52) U.S. Cl.
CPC .............. *H04L 67/02* (2013.01); *G06F 21/608* (2013.01); *H04L 29/06755* (2013.01); *H04L 29/06823* (2013.01); *H04L 41/0803* (2013.01); *H04L 41/0879* (2013.01); *H04L 41/0883* (2013.01); *H04L 41/0886* (2013.01); *H04L 41/22* (2013.01); *H04L 41/28* (2013.01); *H04L 63/101* (2013.01); *H04L 63/0876* (2013.01)

(58) Field of Classification Search
CPC ............ H04L 41/0803; H04L 41/0879; H04L 41/0886; H04L 41/0883; H04L 41/22; H04L 41/28; H04L 29/06823; H04L 29/06755
USPC ......... 709/220, 229, 224, 228, 217, 218, 219, 709/225; 707/634; 380/270; 358/1.15; 370/338; 463/42
See application file for complete search history.

(56) References Cited

U.S. PATENT DOCUMENTS

| 6,351,773 | B1 * | 2/2002 | Fijolek et al. .................. 709/228 |
| 2003/0120624 | A1 * | 6/2003 | Poppenga et al. ............ 707/634 |
| 2005/0055547 | A1 | 3/2005 | Kawamura |

(Continued)

FOREIGN PATENT DOCUMENTS

| EP | 1638017 | 3/2006 |
| KR | 1020090058821 | 6/2009 |

OTHER PUBLICATIONS

Extended European Search Report dated Apr. 24, 2013 issued in EP Application No. 12192968.1.

*Primary Examiner* — Le H Luu
(74) *Attorney, Agent, or Firm* — Staas & Halsey LLP (57) ABSTRACT

A method of managing an image forming apparatus provided with a web server includes receiving a connection request for the web server, determining whether a MAC (Media Access Control) address of a user terminal device that has requested the connection is a pre-stored MAC address, and approving the connection of the user terminal device that has requested the connection to the web server if it is determined that the MAC address of the user terminal device that has requested the connection has been pre-stored.

18 Claims, 6 Drawing Sheets

(51) Int. Cl.
*H04L 29/06* (2006.01)
*G06F 21/60* (2013.01)

(56) References Cited

U.S. PATENT DOCUMENTS

| | | | |
|---|---|---|---|
| 2005/0086328 A1* | 4/2005 | Landram et al. | 709/220 |
| 2005/0254086 A1 | 11/2005 | Shouno | |
| 2006/0251256 A1* | 11/2006 | Asokan et al. | 380/270 |
| 2007/0186104 A1 | 8/2007 | Suzuki | |
| 2009/0147306 A1* | 6/2009 | Sugiyama | 358/1.15 |
| 2009/0150880 A1 | 6/2009 | Park et al. | |
| 2010/0123932 A1 | 5/2010 | Nakamura | |
| 2012/0170559 A1* | 7/2012 | Feinberg et al. | 370/338 |
| 2012/0202603 A1* | 8/2012 | Osato et al. | 463/42 |
| 2012/0246294 A1* | 9/2012 | Eaton et al. | 709/224 |
| 2013/0159541 A1* | 6/2013 | Yu et al. | 709/229 |

* cited by examiner

System Administrator

Administrator Information

Name : System Admin
Phone Number : 01843006250
Location : 35th floor
E-mail Address : test@test.com

— 401

MAC Address of Admin Machine : ☑ Enable

11:11:11:11:11:11
Registration of Admin Machine

IMAGE FORMING APPARATUS TO DETERMINE PRE-STORAGE OF A MAC (MEDIA ACCESS CONTROL) ADDRESS, MANAGEMENT METHOD THEREOF, AND COMPUTER READABLE RECORDING MEDIUM

CROSS-REFERENCE TO RELATED APPLICATIONS

This application claims priority under 35 U.S.C. §119(a) to Korean Patent Application No. 10-2011-0136713, filed on Dec. 16, 2011, in the Korean Intellectual Property Office, the disclosure of which is incorporated herein by reference in its entirety.

BACKGROUND OF THE INVENTION

1. Field of the Invention

The present general inventive concept relates to an image forming apparatus, a management method thereof, and a computer readable recording medium, and more particularly, to an image forming apparatus, a management method thereof, and a computer readable recording medium, which can determine whether to approve a connection of a web server of the image forming apparatus using a MAC (Media Access Control) address of a user terminal device that has requested the connection.

2. Description of the Related Art

An image forming apparatus may be an apparatus that prints print data generated by a terminal device such as a computer on a recording sheet. Examples of such an image forming apparatus may be a copy machine, a printer, a facsimile, and a multifunction peripheral (MFP) in which functions of the above-described devices are combined through one device.

Recently, an image forming apparatus is provided with a web server. Accordingly, an administrator can remotely use setting changes and various supportable functions of the image forming apparatus through connection to the web server.

For the purpose of security and management, the web server supports a login function to limit a user's access and use of the image forming apparatus except for the administrator. In order to perform login, an ID and a password are required, and the administrator can change such an ID and a password during initial installation.

However, in a case where the administrator has lost the administrator ID/password to perform the login to the web server due to lack of management or a mistake, it is required to initialize the image forming apparatus for setting of the administrator ID/password. That is, in the case where the administrator has lost the administrator ID/password, it is required to initialize the image forming apparatus, to perform connection to the web server using an initialized default administrator ID/password, and then to change the default administrator ID/password. However, if the image forming apparatus is initialized, various set values which have already been used to suit the actual use environment are also initialized, and this causes the user inconvenience.

Further, when an image forming apparatus does not support a panel for performing the initialization, it is not possible to initialize the entire setting, and thus in the case where the user has lost the administrator ID/password, the user is unable to use the image forming apparatus.

Accordingly, there is a need for a separate method for solving inconvenience and problems occurring when the administrator ID/password has been lost.

SUMMARY OF THE INVENTION

The present general inventive concept provides an image forming apparatus, a management method thereof, and a computer readable recording medium, which can determine whether to approve a connection to a web server through determination of whether a MAC (Media Access Control) address of a user terminal device that has requested the connection is a pre-stored MAC address, and thus can solve inconvenience and problems occurring in the case where an administrator ID/password has been lost.

The present general inventive concept provides an image forming apparatus, a management method thereof, and a computer readable recording medium, which can display a user interface (UI) window for receiving a selection of whether a MAC address of a user terminal device has been registered, and thus can solve inconvenience and problems occurring in the case where an administrator ID/password has been lost.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of managing an image forming apparatus provided with a web server includes receiving a connection request for the web server, determining whether a MAC (Media Access Control) address of a user terminal device that has requested the connection is a pre-stored MAC address, and if it is determined that the MAC address of the user terminal device that has requested the connection has been pre-stored, approving the connection of the user terminal device that has requested the connection to the web server.

The determining step may include detecting the MAC address of the user terminal device that has requested the connection, which is included in the connection request, and determining whether the detected MAC address of the user terminal device is the pre-stored MAC address through comparison of the detected MAC address of the user terminal device with the pre-stored MAC address.

The method of managing an image forming apparatus may further include, if the connection to the web server is approved, providing an administrator information input web UI window to the connection-approved user terminal device.

The method of managing an image forming apparatus may further include, if the MAC address of the user terminal device that has requested the connection is not the pre-stored MAC address, providing a web UI window for performing login to the user terminal that has requested the connection, if the login is successful, approving the connection of the user terminal device that has requested the connection to the web server, and if the connection to the web server is approved, providing an administrator information input web UI window to the connection-approved user terminal device.

The administrator information input web UI window may include a first area to receive an input of at least one of an administrator name, an administrator phone number, administrator location information, and an administrator e-mail address and a second area to receive a selection of whether the MAC address of the user terminal device has been registered.

The second area may be an area to automatically register the MAC address of the user terminal device or an area to manually register the MAC address of the user terminal device through a direct input thereof.

The method of managing an image forming apparatus may further include, if registration of the MAC address of the user terminal device is selected in the second area, storing the MAC address of the user terminal device.

The method of managing an image forming apparatus may further include providing information on a function of the image forming apparatus, a job history of the image forming apparatus, and a state of supplies installed in the image forming apparatus to the connection-approved user terminal device.

The foregoing and/or other features and utilities of the present general inventive concept may also be achieved by providing an image forming apparatus including a web server to provide a web UI window to a user terminal device, a communication interface unit to receive a connection request for the web server, a storage unit to store a MAC (Media Access Control) address of the user terminal device, and a control unit to determine whether the MAC address of the user terminal device that has requested the connection is a MAC address pre-stored in the storage unit if the connection request for the web server is received, and to approve the connection to the web server if it is determined that the MAC address of the user terminal device that has requested the connection has been pre-stored.

The control unit may control the communication interface unit to detect the MAC address of the user terminal device that has requested the connection, which is included in the connection request, compare the detected MAC address of the user terminal device with the MAC address pre-stored in the storage unit, and determine whether the detected MAC address of the user terminal device is the MAC address pre-stored in the storage unit of the image forming apparatus depending on the result of the comparison.

The control unit may control the web server to provide an administrator information input web UI window to the connection-approved user terminal device if the connection to the web server is approved.

The control unit may control the web server to provide a web UI window to perform login to the user terminal that has requested the connection if the MAC address of the user terminal device that has requested the connection is not the pre-stored MAC address, approve the connection of the user terminal device that has requested the connection to the web server if the login is successful, and control the web server to provide an administrator information input web UI window to the approved user terminal device if the connection to the web server is approved.

The administrator information input web UI window may include a first area to receive an input of at least one of an administrator name, an administrator phone number, administrator location information, and an administrator e-mail address and a second area to receive a selection of whether the MAC address of the user terminal device has been registered.

The second area may be an area to automatically register the MAC address of the user terminal device or an area to manually register the MAC address of the user terminal device through a direct input thereof.

The control unit may control the storage unit to store the MAC address of the user terminal device if registration of the MAC address of the user terminal device is selected in the second area.

The web server may further provide information on a function of the image forming apparatus, a job history of the image forming apparatus, and a state of supplies installed in the image forming apparatus to the connection-approved user terminal device.

The foregoing and/or other features and utilities of the present general inventive concept may also be achieved by providing a computer readable recording medium recorded with a program code to perform a method of managing an image forming apparatus provided with a web server, wherein the method of managing the image forming apparatus includes receiving a connection request for the web server, determining whether a MAC (Media Access Control) address of a user terminal device that has requested the connection is a pre-stored MAC address, and if it is determined that the MAC address of the user terminal device that has requested the connection has been pre-stored, approving the connection of the user terminal device that has requested the connection to the web server.

The foregoing and/or other features and utilities of the present general inventive concept may also be achieved by providing a method of performing a connection between a user terminal device and an image forming apparatus, the method including receiving a request from a user terminal device, determining whether a MAC address of the user terminal device is a pre-stored MAC address; and allowing the user terminal device access to the image forming apparatus if the MAC address of the user terminal device has been pre-stored.

The determining may be performed before a user of the user terminal device performs a login to the image forming apparatus.

The method may further include providing a web UI window to the user terminal device to login a user if the MAC address of the user terminal device is not a pre-stored MAC address, and allowing the user terminal device to access the image forming apparatus if the login is successful.

The method may further include providing an administrator information input web UI window to the user terminal device if the user terminal device is allowed access to the image forming apparatus.

The method may further include storing the MAC address of the user terminal device if registration of the MAC address of the user terminal device is selected in the administrator input web UI window.

The allowing may include allowing the user terminal device to access the image forming apparatus free from a login operation.

The allowing may include allowing the user terminal device to perform a functionality of the image forming apparatus.

The foregoing and/or other aspects and utilities of the present general inventive concept may also be achieved by providing an image forming apparatus including a web server; a storage unit to store a MAC (Media Access Control) address of a user terminal device; and a control unit to determine whether a MAC address of a user terminal device is a pre-stored MAC address stored in the storage unit and to allow the user terminal device to access the web server if the MAC address of the user terminal device has been pre-stored.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
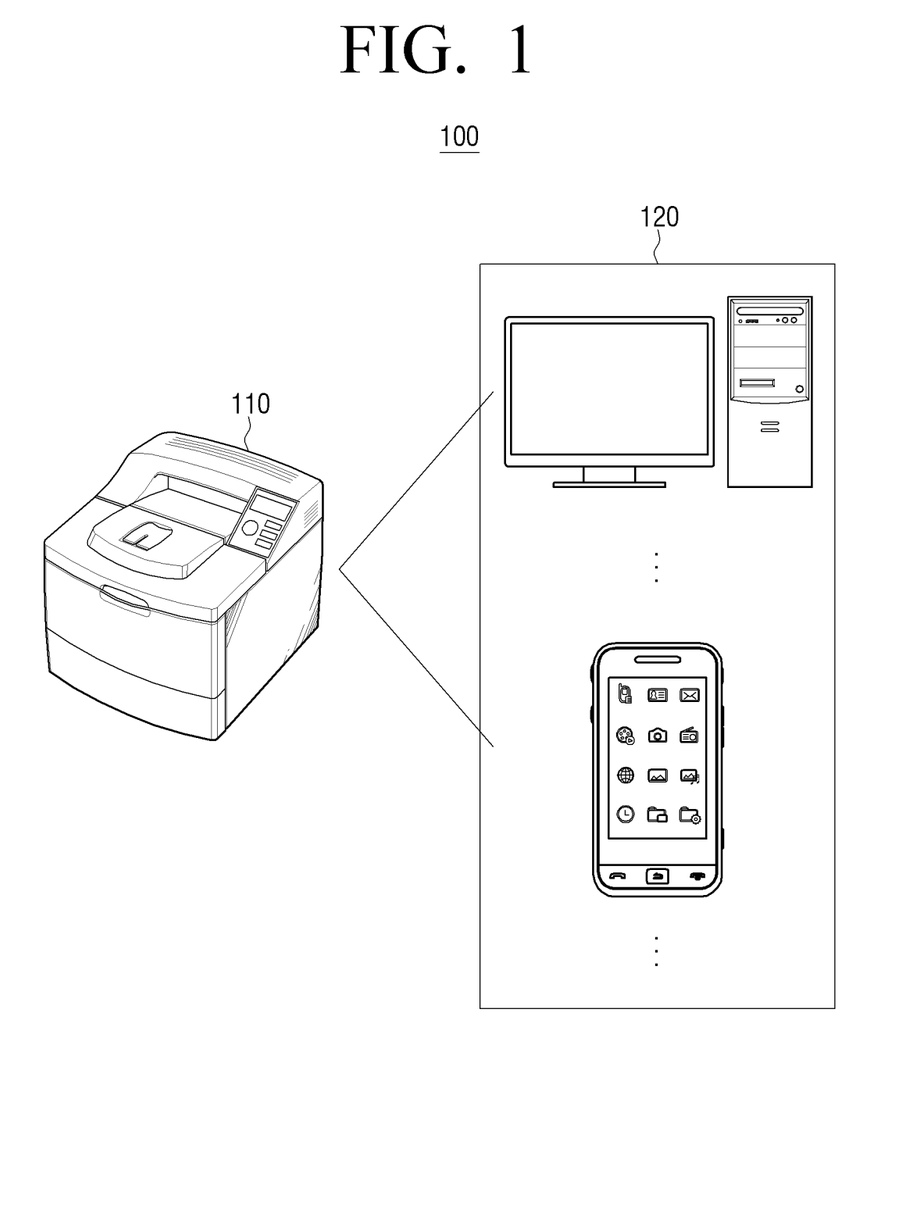
FIG. 1 is a diagram illustrating a management system according to an embodiment of the present general inventive concept.

FIG. 1 is a diagram illustrating a management system according to an embodiment of the present general inventive concept. Referring to FIG. 1, a management system 100 includes an image forming apparatus 110 and a user terminal device 120. The image forming apparatus 110 and the user terminal device 120 may be connected through a wired or wireless communication device or network.

The image forming apparatus 110 may receive a connection request for a web server of the image forming apparatus 110 from the user terminal device 120. If the connection request is received, the image forming apparatus 110 may determine whether a MAC address of the user terminal device 120 that has requested the connection is a MAC address pre-stored in a storage unit of the image forming apparatus 110. If it is determined that the MAC address of the user terminal device 120 that has requested the connection has been pre-stored in the storage unit, the image forming apparatus 110 may approve the connection of the user terminal device 120 that has requested the connection to the web server. If it is determined that the MAC address of the user terminal device 120 that has requested the connection has not been pre-stored in the storage unit of the image forming apparatus 110, the web server of the image forming apparatus 110 may provide a web UI window for performing login to the user terminal device 120 that has requested the connection.

The user terminal device 120 may display the web UI window to perform the login, which is provided from the web server, and an administrator can perform the login through an input of an administrator ID/password onto the web UI window to perform the login. If the administrator ID/password input through the user terminal device 120 coincides with the registered administrator ID/password and the login succeeds, the image forming apparatus 110 may approve the connection of the user terminal device 120 that has requested the connection to the web server. If the login fails, the user terminal device 120 may display the web UI window for performing the login until the login succeeds.

However, depending on the implementation type, the web UI window for performing the login may be eliminated if the number of login failures exceeds a predetermined number of times. In this case, the login may not be performed any more or the web UI window to perform the login may not be displayed after a predetermined number of login failures has elapsed.

Further, if the number of login failures exceeds the predetermined number of times, the MAC address of the user terminal device 120 that has requested the connection may be registered to limit the connection of the corresponding user terminal device thereafter.

If the connection of the user terminal device 120 that has requested the connection to the web server is approved, the web server of the image forming apparatus 110 may provide an administrator information input web UI window to the connection-approved user terminal device 120. Accordingly, the connection-approved user terminal device 120 may display the administrator information input web UI window that is provided from the web server.

Here, the administrator information input web UI window may include a first area to receive an input of at least one of an administrator name, an administrator phone number, administrator location information, and an administrator e-mail address and a second area to receive a selection of whether the MAC address of the user terminal device 120 has been registered.

Depending on the implementation type, the administrator information input web UI window may be provided together with the web UI window to perform the login. That is, if it is determined that the MAC address of the user terminal device 120 that has requested the connection has been pre-stored in the storage unit of the image forming apparatus 110 and the connection is approved without the login process, only the administrator information input web UI window may be activated in a state where both the web UI window to perform the login and the administrator information input web UI window are provided on the screen. Further, if it is determined that the MAC address of the user terminal device 120 that has requested the connection has not been pre-stored in the storage unit of the image forming apparatus 110, only the web UI window to perform the login may be activated in a state where both the web UI window to perform the login and the administrator information input web UI window are provided on the screen. If the login succeeds, the administrator information input web UI window may be provided in an active state.

Further, depending on the implementation type, various types of information that can indicate administrator information may be input through the administrator information input web UI window in addition to the above-described input items.

If the registration of the MAC address of the user terminal device 120 is selected on the administrator information input web UI window, the image forming apparatus stores the MAC address of the user terminal device 120. Here, the UI window to register the MAC address of the user terminal device 120 may be a UI window to automatically register the MAC address of the user terminal device 120 or a UI window to manually register the MAC address of the user terminal device 120 through a direct input.

Depending on the implementation type, not only a UI window to store the MAC address of the user terminal device 120 but also a UI window to update the MAC address, a UI window to delete the MAC address, and a UI window to change the MAC address may be provided.

Here, the image forming apparatus 110 may be an apparatus that prints print data generated by a terminal device such as a computer on a recording sheet. Examples of the image forming apparatus may be a copy machine, a printer, a facsimile, and a multifunction peripheral (MFP) in which functions of the above-described devices are combined through one device.

Further, the user terminal device 120 may be a personal computer, a PDA (Personal Digital Assistant), a laptop computer, or a mobile terminal (for example, a mobile device). However, the user terminal device 120 is not limited thereto, and may be any user terminal device using a MAC address.

Although FIG. 1 illustrates one image forming apparatus and one user terminal device, a plurality of image forming apparatuses may be implemented to be connected to a plurality of user terminal devices.

Further, although FIG. 1 illustrates a wired connection, a wireless connection may also be implemented.

Further, although FIG. 1 illustrates the image forming system implemented in one network, the image forming system may be implemented in different networks. In this case, repeaters for communications between the different networks may be provided.

As described above, according to the management system according to an embodiment of the present general inventive concept, whether to approve and/or perform the connection to the web server is determined through determination of whether the MAC (Media Access Control) address of the user terminal device that has requested the connection is the pre-stored MAC address before performing the login, and thus inconvenience and problems occurring in the case where the administrator ID/password has been lost can be solved. That is, since the administrator has registered the MAC address of the user terminal device frequently used, the administrator can connect to the web server without the login operation using the user terminal device of which the MAC address has been registered in the case where the administrator ID/password is lost. Further, by changing the lost administrator ID/password through the connection-approved web server, the problem that the image forming apparatus should be initialized if the administrator ID/password is lost can be solved.

Further, by displaying the UI window to receive a selection of whether the MAC address of the user terminal device has been registered, inconvenience and problems occurring in the case where the administrator ID/password has been lost can be solved. That is, user convenience can be provided so as to cope with a loss of the administrator ID/password.

Figure 2:
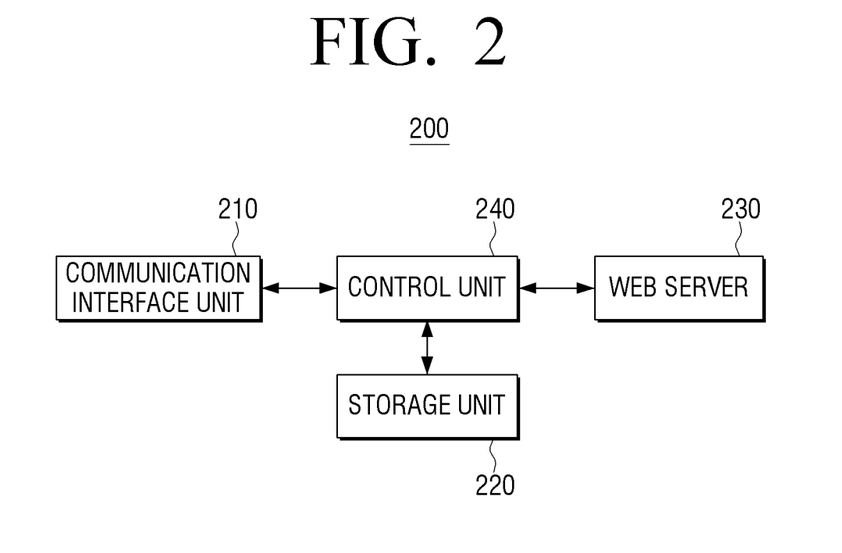
FIG. 2 is a block diagram illustrating the configuration of an image forming apparatus according to an embodiment of the present general inventive concept.

FIG. 2 is a block diagram illustrating the configuration of an image forming apparatus according to an embodiment of the present general inventive concept. Referring to FIG. 2, an image forming apparatus 200 includes a communication interface unit 210, a storage unit 220, a web server 230, and a control unit 240.

The communication interface unit 210 serves to connect the image forming apparatus 200 to a user terminal device 120.

The image forming apparatus 200 can receive print data generated by the user terminal device 120 through the communication interface unit 210.

Further, the image forming apparatus 200 can receive a connection request for the web server 230 from the user terminal device 120 through the communication interface unit 210.

Here, the communication interface unit 210 may be connected not only by wire or wirelessly through a LAN (Local Area Network) and the Internet but also through a USB (Universal Serial Bus) port.

The storage unit 220 functions to store various programs and data required to drive the image forming apparatus 200.

Further, the storage unit 220 may pre-store the MAC (Media Access Control) address of the user terminal device 120.

That is, as the administrator stores the MAC address of the user terminal device 120 frequently used, the storage unit 220 may pre-store the MAC address of the user terminal device 120.

Further, the storage unit 220 may store the selected MAC address of the user terminal device 120 if the registration of the MAC address of the user terminal device 120 is selected on the administrator information input web UI window.

Here, the storage unit 220 may be implemented by not only a built-in type storage device, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, and a memory card, but also a detachable type storage device such as a USB memory and a CD-ROM.

The web server 230 functions to provide a web service.

The web server 230 may provide a web UI for performing login of the user terminal device 120 that has requested the connection. Accordingly, in the case where the user terminal device 120 intends to connect to the web server 230, the web UI window for performing the login may be displayed on the display unit of the user terminal device 120.

The web server 230 may provide an administrator information input web UI window to the connection-approved user terminal device 120. Accordingly, if the connection of the user terminal device 120 to the web server 230 is approved, the administrator information input web UI window may be displayed on the display unit of the connection-approved user terminal device 120.

Here, the administrator information input web UI window may include a first area to receive an input of at least one of an administrator name, an administrator phone number, administrator location information, and an administrator e-mail address and a second area to receive a selection of whether the MAC address of the user terminal device has been registered.

Further, the web server 230 may further provide information on a function of the image forming apparatus, a job history of the image forming apparatus, and a state of supplies installed in the image forming apparatus to the connection-approved user terminal device.

Here, the information on the function of the image forming apparatus may be information on which function the image forming apparatus can perform. That is, the function of the image forming apparatus may include printing, faxing, copying, and scanning.

Further, the information on the job history of the image forming apparatus may mean information on the history of the job that is performed by the image forming apparatus up to now. That is, in the case of a fax function, the job history information may be information on how long the faxing was performed, when or to whom the fax was transmitted, or when or from whom the fax was received.

Further, the information on the state of supplies installed in the image forming apparatus may mean information on the remaining quantities of the supplies installed in the image forming apparatus and usable terms of the supplies. Here, the information on the state of supplies may include information on the remaining toner and information on remaining sheets.

In FIG. 2, it is exemplified that the web server 230 is included in the image forming apparatus 200. However, the location of the web server 230 is not limited thereto, and the web server 230 may be implemented to be separated from the image forming apparatus 200.

The control unit 240 controls the whole function of the image forming apparatus 200. Specifically, the control unit 240 may control the communication interface unit 210, the storage unit 220, and the web server 230.

Further, if a connection request for the web server 230 is received from the user terminal device 120 through the communication interface unit 210, the control unit 240 may determine whether the MAC address of the user terminal device 120 that has requested the connection is the MAC address pre-stored in the storage unit 220.

Here, the MAC address is a quasi-unique identifier assigned to a network interface card in computer networking. That is, the MAC address is an operating number such as a name of a specified network interface card. Accordingly, LAN cards provided in two different computers have different names, that is, different MAC addresses. Further, several LAN cards in a router, or an Ethernet adapter and a wireless adapter provided in the same computer are applied in the same manner. Here, the MAC address is composed of 48 bits in total. The first 24 bits contain information on a network interface card manufacturer, and the remaining 24 bits contain information on the network interface card.

That is, if the connection request for the web server 230 is received from the user terminal device 120 through the communication interface unit 210, the control unit 240 may control the communication interface unit 210 to detect the MAC address of the user terminal device 120 that has requested the connection, which is included in the connection request. Here, it is assumed that the connection request is made using an HTTP protocol to detect the MAC address of the user terminal device 120. That is, the communication interface unit 210 may detect the MAC address using an ioctl function of a socket that is mapped on the HTTP connection request. However, the MAC address detection method is not limited thereto, and various known methods may be used to detect the MAC address.

If the MAC address of the user terminal device 120 that has requested the connection is detected, the control unit 240 may compare the detected MAC address of the user terminal device 120 with the MAC address pre-stored in the storage unit 220, and may determine whether the detected MAC address of the user terminal device 120 is the MAC address pre-stored in the storage unit 220 depending on the result of the comparison.

If it is determined that the MAC address of the user terminal device 120 that has requested the connection has been pre-stored, the control unit 240 may approve the connection to the web server 230. That is, the administrator has registered the MAC address of the user terminal device frequently used, and in the case where the administrator ID/password is lost, the administrator can connect to the web server using the user terminal device of which the MAC address has been registered without any separate login procedure. Accordingly, by changing the lost administrator ID/password through the connection-approved web server, the problem that the image forming apparatus should be initialized as in the related art when the administrator ID/password is lost can be solved.

If the MAC address of the user terminal device 120 that has requested the connection is not the pre-stored MAC address, the control unit 240 may control the web server 230 to provide a web UI window for performing login to the user terminal device 120 that has requested the connection. Accordingly, the user terminal device 120 can display the web UI window to perform the login, which is provided from the web server, and the administrator can perform the login through inputting of the administrator ID/password onto the web UI window to perform the login. If the administrator ID/password input through the user terminal device 120 coincides with the registered administrator ID/password and the login succeeds, the control unit 240 may approve the connection of the user terminal device 120 that has requested the connection to the web server. If the login fails, the user terminal device 120 may display the web UI window to perform the login until the login succeeds.

However, depending on the implementation type, the web UI window to perform the login may be implemented to be eliminated if the number of login failures exceeds a predetermined number of times. In this case, the login may not be performed any more or the web UI window to perform the login may not be displayed after a predetermined number of login failures has elapsed.

Further, if the number of login failures exceeds the predetermined number of times, the MAC address of the user terminal device 120 that has requested the connection may be registered to limit the connection of the corresponding user terminal device thereafter.

If it is determined that the MAC address of the user terminal device 120 that has requested the connection has been pre-stored, or the login succeeds and the connection to the web server is approved, the control unit 240 may control the web server 230 to provide an administrator information input web UI window to the connection-approved user terminal device 120. Accordingly, the user terminal device 120 can display the administrator information input web UI window that is provided from the web server.

Here, the administrator information input web UI window may include a first area to receive an input of at least one of an administrator name, an administrator phone number, administrator location information, and an administrator e-mail address and a second area to receive a selection of whether the MAC address of the user terminal device 120 has been registered. That is, by displaying the UI window for receiving a selection of whether the MAC address has been registered in the second area, inconvenience and problems occurring in the case where the administrator ID/password has been lost can be solved. That is, user convenience can be provided so as to cope with a loss of the administrator ID/password.

Depending on the implementation type, the administrator information input web UI window may be provided together with the web UI window to perform the login. That is, if it is determined that the MAC address of the user terminal device 120 that has requested the connection has been pre-stored in the storage unit of the image forming apparatus 110 and the connection is approved without the login process, only the administrator information input web UI window may be activated in a state where both the web UI window to perform the login and the administrator information input web UI window are provided on the screen. Further, if it is determined that the MAC address of the user terminal device 120 that has requested the connection has not been pre-stored in the storage unit of the image forming apparatus 110, only the web UI window to perform the login may be activated in a state where both the web UI window for performing the login and the administrator information input web UI window are provided on the screen. If the login succeeds, the administrator information input web UI window may be provided in an active state.

Depending on the implementation type, various types of information that can indicate administrator information may be input through the administrator information input web UI window in addition to the above-described input items.

If the registration of the MAC address of the user terminal device 120 is selected on the administrator information input web UI window, the MAC address of the user terminal device 120 is stored. Here, the UI window to register the MAC address of the user terminal device 120 may be a UI window to automatically register the MAC address of the user terminal device 120 or a UI window to manually register the MAC address of the user terminal device 120 through a direct input. This will be described in detail with reference to FIGS. 3 and 4.

Depending on the implementation type, not only a UI window to store the MAC address of the user terminal device 120 but also a UI window to update the MAC address, a UI window to delete the MAC address, and a UI window to change the MAC address may be provided.

Further, the control unit 240 may control the web server 230 to further provide information on a function of the image forming apparatus, a job history of the image forming apparatus, and a state of supplies installed in the image forming apparatus to the connection-approved user terminal device. Accordingly, the user terminal device 120 can display the function of the connection-approved image forming apparatus, the job history of the connection-approved image forming apparatus, and the state of supplies installed in the connection-approved image forming apparatus, which are provided from the web server.

Figure 3:
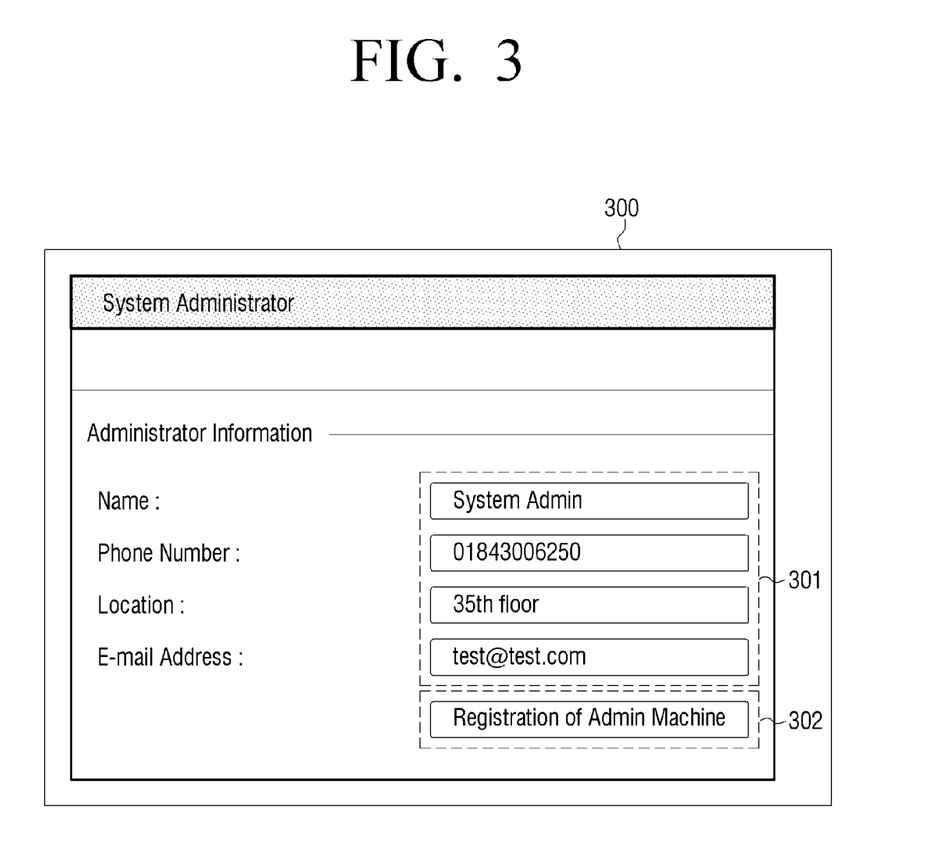
FIGS. 3 and 4 are diagrams illustrating an administrator information input web UI window.
Figure 4:
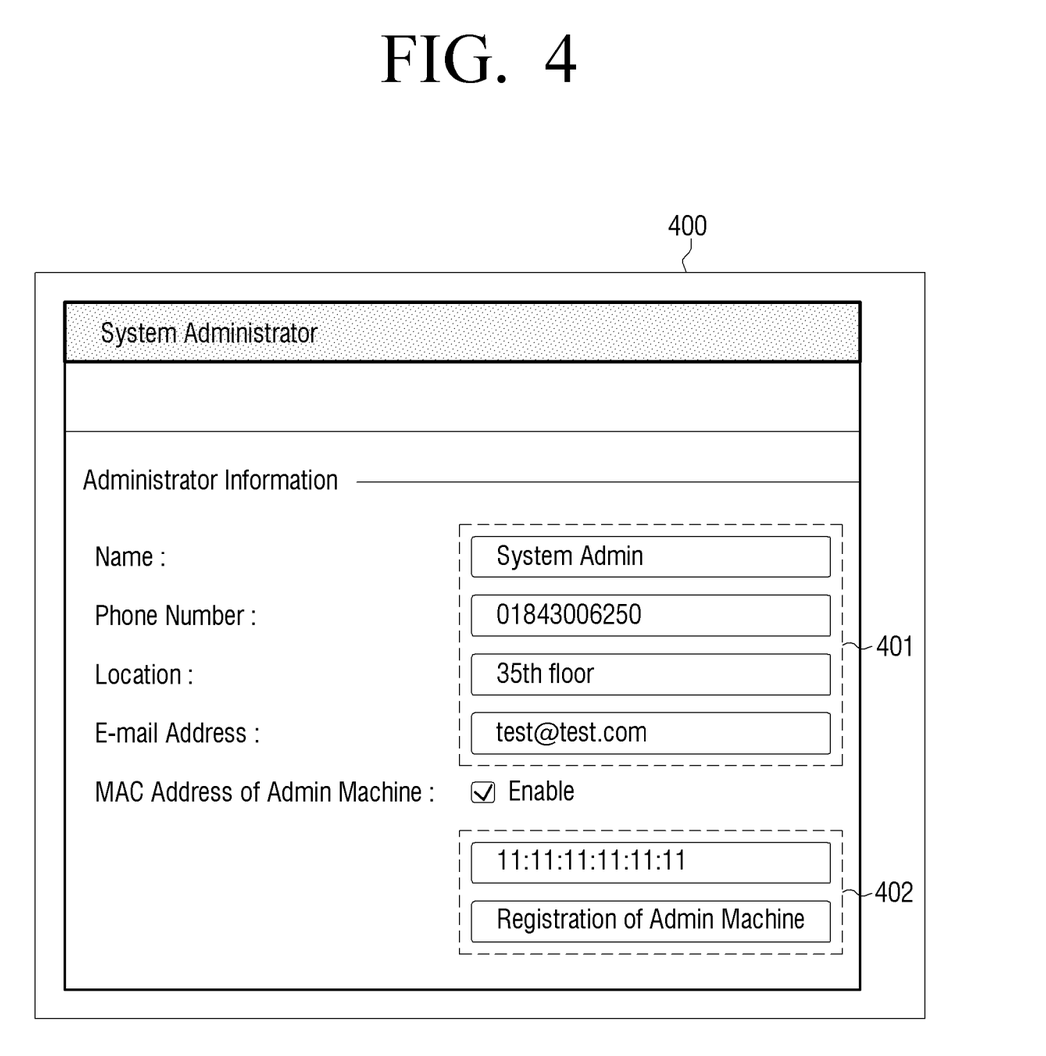

FIGS. 3 and 4 are diagrams illustrating an administrator information input web UI window.

Referring to FIG. 3, the administrator information input web UI window 300 includes a first area 301 to receive an input of at least one of an administrator name, an administrator phone number, administrator location information, and an administrator e-mail address and a second area 302 to receive a selection of whether the MAC address of the user terminal device 120 has been registered.

Here, the administrator information input web UI window 300 may be provided to the user terminal device 120 by the web server, and thus the display unit of the user terminal device 120 may display the administrator information input web UI window 300.

The administrator inputs administrator information onto the first area 301, and if a problem occurs in the image forming apparatus 200, the image forming apparatus 200 automatically notifies the administrator of the problem of the image forming apparatus 200 using an e-mail or a phone number. Further, since the administrator information is displayed on a local panel of the image forming apparatus 200, the user of the image forming apparatus in which the problem has occurred can notify the administrator of the problem occurrence.

If the administrator selects the second area 302, the image forming apparatus can automatically store the MAC address of the connection-approved user terminal device 120. By doing so, inconvenience and problems occurring in the case where the administrator ID/password has been lost can be solved. That is, administrator convenience can be provided so as to cope with a loss of the administrator ID/password.

Referring to FIG. 4, the administrator information input web UI window 400 includes a first area 401 for receiving an input of at least one of an administrator name, an administrator phone number, administrator location information, and an administrator e-mail address and a second area 402 for receiving a selection of whether the MAC address of the user terminal device 120 has been registered. In the description with reference to FIG. 4, the detailed description of the duplicate portion in FIG. 3 will be omitted.

The administrator may manually input the MAC address of the user terminal device 120 through the second area 402. That is, the administrator may enable the MAC address input, and thus manually input the MAC address of the user terminal device 120 of which the registration is desired. In this case, it is possible to input not only the MAC address of the connection-approved user terminal device 120 but also the MAC address of the user terminal device 120 that the administrator intends to use afterwards, and thus administrator convenience can be provided.

Figure 5:
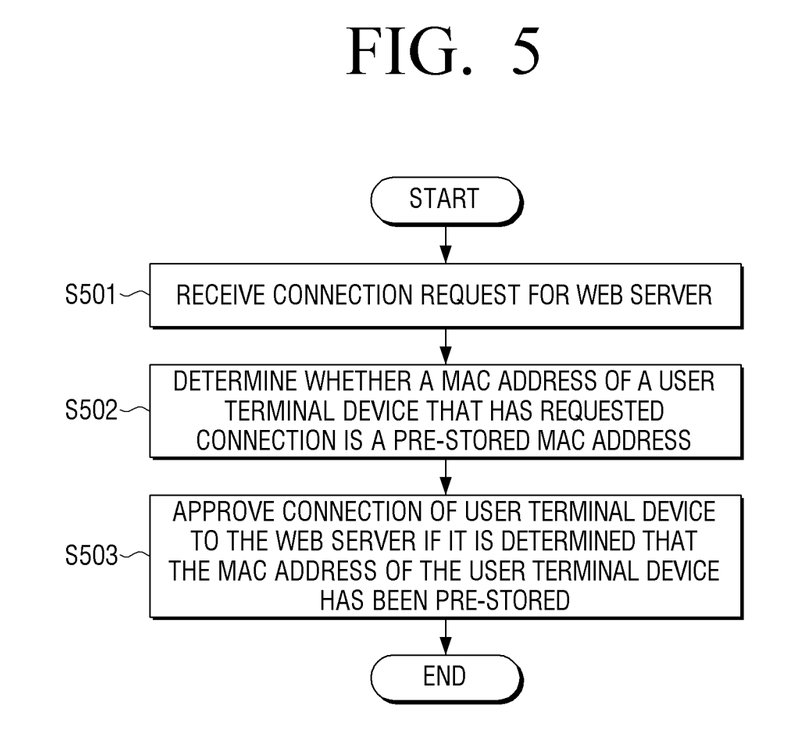
FIG. 5 is a flowchart illustrating a method of managing an image forming apparatus according to an embodiment of the present general inventive concept.

FIG. 5 is a flowchart illustrating a method of managing an image forming apparatus according to an embodiment of the present general inventive concept. Referring to FIG. 5, a connection request for a web server is received at operation S501. Then, it is determined whether a MAC address of a user terminal device that has requested the connection is a pre-stored MAC address at operation S502. If it is determined that the MAC address of the user terminal device that has requested the connection has been pre-stored, the connection of the user terminal device that has requested the connection to the web server is approved at operation S503. Hereinafter, the details thereof will be described with reference to FIG. 6.

Figure 6:
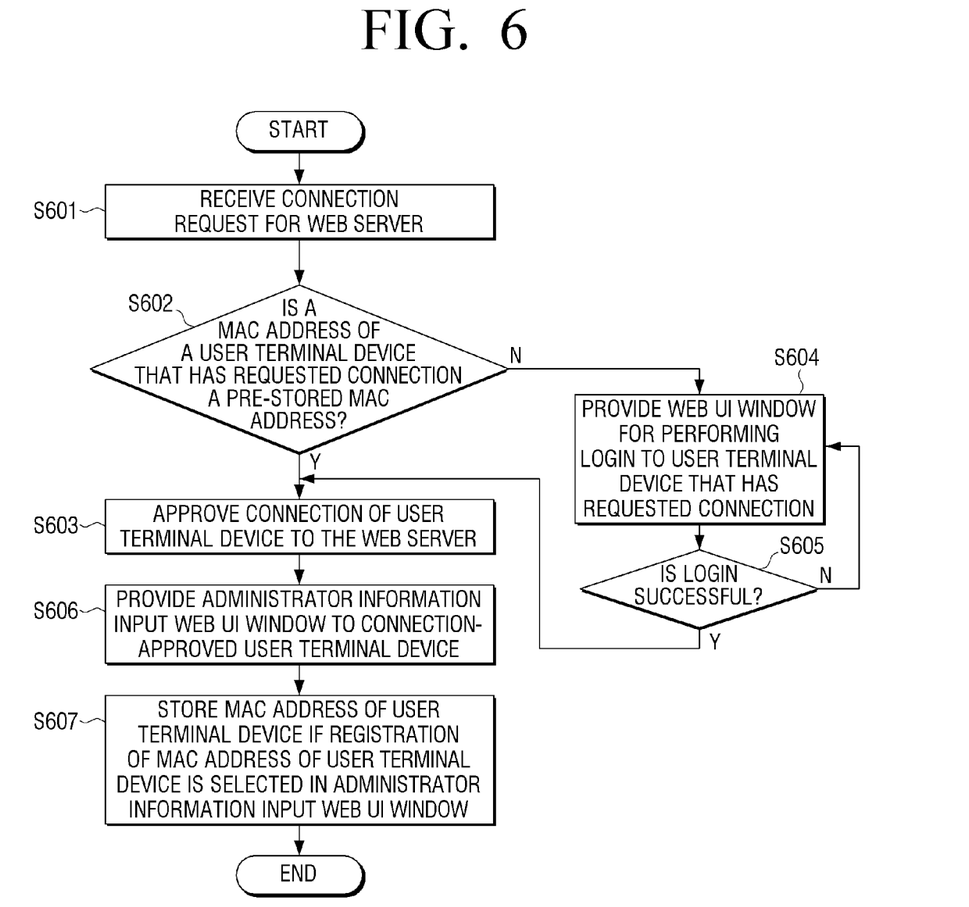
FIG. 6 is a flowchart illustrating a method of managing an image forming apparatus according to an embodiment of the present general inventive concept.

FIG. 6 is a flowchart illustrating the method of FIG. 5 in detail. Referring to FIGS. 5 and 6, the connection request for the web server is received at operation S601. Then, it is determined whether the MAC address of the user terminal device that has requested the connection is the pre-stored MAC address at operation S602. If it is determined that the MAC address of the user terminal device that has requested the connection has been pre-stored at operation S602, the connection of the user terminal device that has requested the connection to the web server is approved at operation S603. If it is determined that the MAC address of the user terminal device that has requested the connection has not been pre-stored at operation S602, a web UI window to perform login is provided to the user terminal device that has requested the connection at operation S604.

If the login succeeds at operation S605 on the web UI window to perform the login, the connection of the user terminal device that has requested the connection to the web server is approved at operation S603. If the login fails at operation S605 on the web UI window to perform the login, the web UI window to perform the login is provided to the user terminal device that has requested the connection at operation S604.

If the connection of the user terminal device that has requested the connection to the web server is approved at operation S603, an administrator information input web UI window is provided to the connection-approved user terminal device at operation S606.

If registration of the MAC address of the user terminal device is selected in the administrator information input web UI window, the MAC address of the user terminal device is stored at operation S607.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Accordingly, a program may be installed so that the management method can be executed by an apparatus which is connected to or mounts such recording media.

As described above, according to various embodiments of the present general inventive concept, whether to approve the connection to the web server is determined through determination of whether the MAC (Media Access Control) address of the user terminal device that has requested the connection is the pre-stored MAC address before performing the login, and thus inconvenience and problems occurring in the case where the administrator ID/password has been lost can be solved. That is, since the administrator has registered the MAC address of the user terminal device frequently used, the administrator can connect to the web server without the login operation using the user terminal device of which the MAC address has been registered in the case where the administrator ID/password is lost. Further, by changing the lost administrator ID/password through the connection-approved web server, the problem that the image forming apparatus should be initialized if the administrator ID/password is lost can be solved.

Further, according to various embodiments of the present general inventive concept, by displaying the UI window for receiving the selection of whether the MAC address of the user terminal device has been registered, inconvenience and problems occurring in the case where the administrator ID/password has been lost can be solved. That is, user convenience can be provided so as to cope with a loss of the administrator ID/password.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of managing an image forming apparatus provided with a web server, comprising:
   receiving a connection request for the web server;
   determining whether a MAC (Media Access Control) address of a user terminal device requesting the connection to the web server is a pre-stored MAC address;
   approving the connection of the user terminal device that has requested the connection to the web server if it is determined that the MAC address of the user terminal device has been pre-stored; and
   providing an administrator information input web UI window to allow an administrator to automatically register the MAC address of the user terminal device and manually register the MAC address of the user terminal device through a direct input thereof.

2. The method of claim 1, wherein the determining comprises:
   detecting the MAC address of the user terminal device that has requested the connection; and
   determining whether the detected MAC address of the user terminal device is the pre-stored MAC address through comparison of the detected MAC address of the user terminal device with the pre-stored MAC address.

3. The method of claim 1, wherein the administrator information input web UI window is provided to the user terminal device if the connection to the web server is approved.

4. The method of claim 3, wherein the administrator information input web UI window comprises a first area to receive an input of at least one of an administrator name, an administrator phone number, administrator location information, and an administrator e-mail address and a second area to receive a selection of whether the MAC address of the user terminal device has been registered.

5. The method of claim 4, further comprising:
   storing the MAC address of the user terminal device if registration of the MAC address of the user terminal device is selected in the second area.

6. The method of claim 1, further comprising:
   providing a web UI window to perform login to the user terminal device that has requested the connection if the MAC address of the user terminal device that has requested the connection is not the pre-stored MAC address;
   approving the connection of the user terminal device that has requested the connection to the web server if the login is successful; and
   providing the administrator information input web UI window to the user terminal device if the connection to the web server is approved.

7. The method of claim 1, further comprising:
   providing information on a function of the image forming apparatus, a job history of the image forming apparatus, and a state of supplies installed in the image forming apparatus to the user terminal device if the connection to the web server is approved.

8. An image forming apparatus comprising:
   a web server to provide a web UI window to a user terminal device;
   a communication interface unit to receive a connection request for the web server;
   a storage unit to store a MAC (Media Access Control) address of the user terminal device; and
   a control unit to determine whether the MAC address of the user terminal device that has requested the connection is a MAC address pre-stored in the storage unit if the connection request for the web server is received, and to approve the connection to the web server if it is determined that the MAC address of the user terminal device has been pre-stored,
   wherein the control unit controls the web server to provide an administrator information input web UI window to allow an administrator to automatically register the MAC address of the user terminal device and manually register the MAC address of the user terminal device through a direct input thereof.

9. The image forming apparatus of claim 8, wherein the control unit controls the communication interface unit to detect the MAC address of the user terminal device that has requested the connection, compares the detected MAC address of the user terminal device with the MAC address pre-stored in the storage unit, and determines whether the detected MAC address of the user terminal device is the MAC address pre-stored in the storage unit of the image forming apparatus depending on the result of the comparison.

10. The image forming apparatus of claim 8, wherein the control unit controls the web server to provide the administrator information input web UI window to the user terminal device if the connection to the web server is approved.

11. The image forming apparatus of claim 10, wherein the administrator information input web UI window comprises a first area to receive an input of at least one of an administrator name, an administrator phone number, administrator location information, and an administrator e-mail address and a second area to receive a selection of whether the MAC address of the user terminal device has been registered.

12. The image forming apparatus of claim 11, wherein the control unit controls the storage unit to store the MAC address of the user terminal device if registration of the MAC address of the user terminal device is selected in the second area.

13. The image forming apparatus of claim 8, wherein the control unit controls the web server to provide a web UI window to perform login to the user terminal device that has requested the connection if the MAC address of the user terminal device is not a pre-stored MAC address, approves the connection of the user terminal device to the web server if the login is successful, and controls the web server to provide the administrator information input web UI window to the user terminal device if the connection to the web server is approved.

14. The image forming apparatus of claim 8, wherein the web server further provides information on a function of the image forming apparatus, a job history of the image forming apparatus, and a state of supplies installed in the image forming apparatus to the user terminal device if the connection to the web server is approved.

15. A non-transitory recording medium recorded with a program code for performing a method of managing an image forming apparatus provided with a web server, the method comprising:
    receiving a connection request for the web server;
    determining whether a MAC (Media Access Control) address of a user terminal device that has requested the connection is a pre-stored MAC address;
    approving the connection of the user terminal device to the web server if it is determined that the MAC address of the user terminal device has been pre-stored; and
    providing an administrator information input web UI window to allow an administrator to automatically register the MAC address of the user terminal device and manually register the MAC address of the user terminal device through a direct input thereof.

16. A method of performing a connection between a user terminal device and an image forming apparatus, the method comprising:
    receiving a request from a user terminal device;
    determining whether a MAC (Media Access Control) address of the user terminal device is a pre-stored MAC address;
    allowing the user terminal device to access the image forming apparatus if the MAC address of the user terminal device has been pre-stored; and
    providing a web UI window to allow an administrator to automatically register the MAC address of the user terminal device and manually register the MAC address of the user terminal device through a direct input thereof.

17. The method of claim 16, wherein the determining is performed before a user of the user terminal device performs a login to the image forming apparatus.

18. The method of claim 16, further comprising:
    providing the web UI window to the user terminal device to login a user if the MAC address of the user terminal device is not a pre-stored MAC address; and
    allowing the user terminal device to access the image forming apparatus if the login is successful.

* * * * *